United States Patent
Rutkai

(10) Patent No.: US 10,024,578 B1
(45) Date of Patent: Jul. 17, 2018

(54) COMBINATION FENCE AND SOLAR HEATER FOR SWIMMING POOLS

(76) Inventor: Randy L. Rutkai, Belmont, NC (US)

( * ) Notice: Subject to any disclaimer, the term of this patent is extended or adjusted under 35 U.S.C. 154(b) by 740 days.

(21) Appl. No.: 13/292,077

(22) Filed: Nov. 8, 2011

Related U.S. Application Data

(60) Provisional application No. 61/411,470, filed on Nov. 8, 2010.

(51) Int. Cl.
*F24J 2/42* (2006.01)
*F24J 2/04* (2006.01)

(52) U.S. Cl.
CPC .............. *F24J 2/423* (2013.01); *F24J 2/0427* (2013.01)

(58) Field of Classification Search
CPC F24J 2/0427; F24J 2/055; F24J 2/4647; F24J 2/507; E04H 17/16; Y02E 10/44
USPC ....... 126/563, 652, 655, 633, 663, 671, 673, 126/906
See application file for complete search history.

(56) References Cited

U.S. PATENT DOCUMENTS

| | | | | |
|---|---|---|---|---|
| 3,933,311 A | * | 1/1976 | Lemelson | 239/276 |
| 3,945,059 A | * | 3/1976 | Allocco, Jr. | 126/563 |
| 4,061,132 A | * | 12/1977 | Ashton et al. | 126/584 |
| 4,102,328 A | * | 7/1978 | Stiff | 126/563 |
| 4,164,933 A | | 8/1979 | Alosi | |
| 4,187,901 A | * | 2/1980 | Coleman et al. | 165/47 |
| 4,205,655 A | * | 6/1980 | Hunt | 126/635 |
| 4,206,748 A | * | 6/1980 | Goodman et al. | 126/668 |
| 4,211,213 A | * | 7/1980 | Nissen et al. | 126/563 |
| 4,233,957 A | * | 11/1980 | Kenny | 126/652 |
| 4,238,247 A | * | 12/1980 | Oster, Jr. | 136/247 |
| 4,280,477 A | * | 7/1981 | Divine | 126/563 |
| 4,324,230 A | * | 4/1982 | Lunsford | 126/655 |
| 4,333,447 A | * | 6/1982 | Lemrow et al. | 126/657 |
| 4,359,042 A | * | 11/1982 | Belentepe et al. | 126/570 |
| 4,381,763 A | * | 5/1983 | Kahl | 126/563 |
| 4,474,168 A | * | 10/1984 | Pettit | 126/563 |
| 4,505,262 A | * | 3/1985 | Eaton | 126/646 |
| 4,932,085 A | * | 6/1990 | Saj | 4/493 |
| 5,012,796 A | * | 5/1991 | Park | 126/563 |

(Continued)

OTHER PUBLICATIONS

Groovy Green, Summer Groove: Solar Pool Fence and Solar Garden Shower, Published Apr. 16, 2007, (http://www.groovygreen.com/groove/?p=1293).

(Continued)

*Primary Examiner* — Avinash Savani
*Assistant Examiner* — Deepak Deean
(74) *Attorney, Agent, or Firm* — Rankin, Hill & Clark LLP

(57) ABSTRACT

A combination fence and solar heater. The fence for enclosing a swimming pool and heating water from the swimming pool in order to provide more comfortable swimming conditions and a longer swimming season. The fence includes posts, upper and lower rails, and pickets. The rails include first and second conduits, each having a passageway for carrying water being circulated in communication with the swimming pool. The first conduit has an exterior surface that is exposed to the sun; absorbing solar energy which heats the stream of water therein. The second conduit is nested within the first conduit and absorbs a portion of the energy absorbed by the first conduit. Often, water temperatures within the first and second conduits differ from each other, allowing for discharge of heated water over a range of temperatures to the swimming pool.

12 Claims, 5 Drawing Sheets

(56) References Cited

U.S. PATENT DOCUMENTS

| | | | |
|---|---|---|---|
| 5,572,988 A * | 11/1996 | Walton | 126/652 |
| 7,032,891 B2 * | 4/2006 | Rowley et al. | 256/26 |
| 7,137,413 B2 * | 11/2006 | Bauer et al. | 138/39 |
| 7,389,975 B2 * | 6/2008 | Rowley et al. | 256/24 |
| 8,164,448 B2 * | 4/2012 | Boudreau | 340/550 |
| 8,333,185 B1 * | 12/2012 | Gourley | 126/563 |
| 2003/0221734 A1 * | 12/2003 | Bauer et al. | 138/38 |
| 2004/0140462 A1 * | 7/2004 | Rowley et al. | 256/27 |
| 2006/0131552 A1 * | 6/2006 | Rowley et al. | 256/59 |
| 2009/0107489 A1 * | 4/2009 | Gee et al. | 126/646 |
| 2009/0200531 A1 * | 8/2009 | Rowley et al. | 256/27 |
| 2009/0293866 A1 * | 12/2009 | Horne et al. | 126/655 |
| 2010/0288264 A1 * | 11/2010 | Zhang | 126/563 |

OTHER PUBLICATIONS

Sun Fence, Solar Swimming Pool Heating Collector Systems by Sunfence, Dec. 4, 2004, (http://web.archive.org/web/20041204095759/www.sunfence.com/sunfence_technical.html).

* cited by examiner

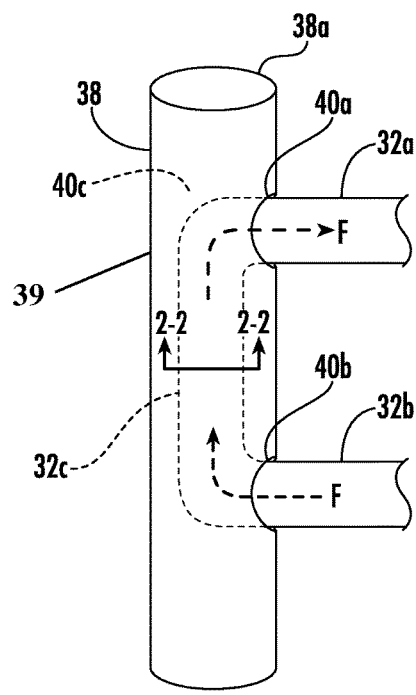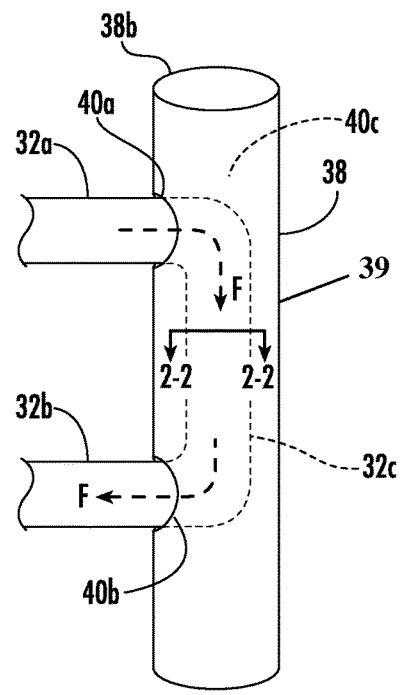
FIG. 4    FIG. 5
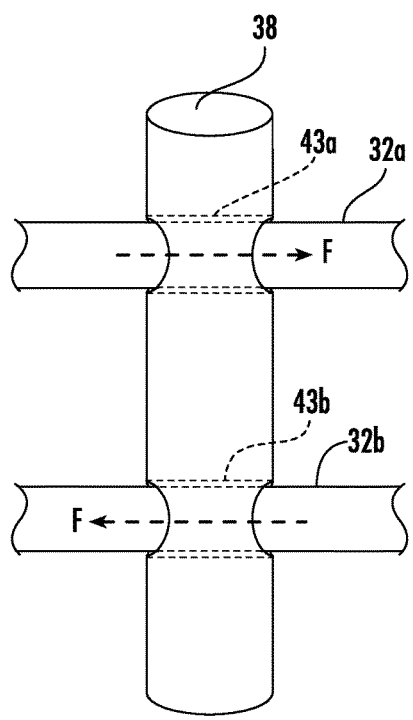
FIG. 7

COMBINATION FENCE AND SOLAR HEATER FOR SWIMMING POOLS

CROSS REFERENCE TO RELATED APPLICATIONS

This application claims the benefit of U.S. Provisional Application No. 61/411,470, filed Nov. 8, 2010, which is incorporated herein by reference in its entirety.

BACKGROUND OF THE INVENTION

1. Field of the Invention

The present invention relates to a solar heater for a swimming pool and, more specifically, to a fence which serves as both a traditional fence and as a solar heater for a swimming pool, spa and/or hot tub.

2. Description of the Related Art

The ability to adjust the temperature of a swimming pool, hot tub or spa (collectively "swimming pool") has long been recognized as desirable and numerous devices have been developed for this purpose. By heating swimming pool water, the seasonal use of the pool is extended as well as the comfort level during use.

Some known devices for heating swimming pool water include solar panels, gas or propane heaters, and heat pumps. However, these devices are limited by high installation and operational costs, minimal effectiveness, being unaesthetic and/or having inadequate space to locate the device. For example, solar panels are expensive and by typically being mounted on roof of a house are considered unaesthetic, gas and propane heaters are expensive to operate, and heat pumps provide only a minimal increase in water temperature.

In most communities, swimming pools are required to employ a fence to prevent access of unauthorized persons, particularly children, to the pool as a safety measure. A fence may also be desirable or necessary for obtaining or reducing the costs of insurance premiums.

In view of the above stated limitation of conventional pool water heating devices (e.g. solar panels, gas and propane heaters, and heat pumps) and recognizing the need for fencing around a pool, combination fences have been developed which serve as a security fence and also function as a solar heater to heat pool water. Examples of this type of fence are described, for example, in U.S. Pat. No. 5,572,988 to Walton, U.S. Pat. No. 4,474,168 to Pettit, U.S. Pat. No. 4,381,763 to Kahl, U.S. Pat. No. 4,280,477 to Divine, and U.S. Pat. No. 4,211,213 to Nissen et al.

Although these combination fences contribute to the pertinent art, they are not without limitations. For example, there is a need in the art to provide for a combination fence that allows for significant heating of a large volume of water for introduction into a swimming pool. Additionally, there is a need in the art for a combination fence that provides an option of introducing heated water into a pool at more than one temperature. There is also a need in the art for a combination fence that insulates water that is heated from rapid heat loss to the environment. Moreover, there is a need in the art for a combination fence having the appearance and security of a conventional fence and being of a simple, cost effective construction. Accordingly, there is an ongoing need to advance the art of combination fences.

BRIEF SUMMARY OF THE INVENTION

The present invention is an improved combination fence and solar heater for heating water for use in a swimming pool.

In an embodiment, the present invention is a rail for a combination fence and solar heater. The rail is part of a fence panel or attachable to at least one post to form a fence panel for being positioned about the swimming pool and provide a protective safety barrier about the swimming pool. The rail also serves to absorb solar energy for heating water of a swimming pool. To achieve this advantages, the rail includes first and second conduits. The first conduit has an exterior surface, an inner surface which defines a first passageway, and an inlet and an outlet for communicating with water from a swimming pool. The second conduit is disposed within and insulated by the first conduit and has an exterior surface, an inner surface which defines a second passageway, and an inlet and an outlet for communicating with water from the swimming pool. The first and second conduits are configured to carry respective first and second streams of water during normal operation of the invention. In operation, the exterior surface of the first conduit communicates with the sun whereby a portion of solar energy absorbed by the first conduit is transferred to and heats the first stream of water during operation. And, a portion of solar energy absorbed by the first conduit is transferred to the second conduit and in part to the second stream of water and heats the second stream of water. The rail is part of a fence panel or attachable to at least one post to form a fence panel for being positioned about the swimming pool and providing a protective safety barrier about the swimming pool.

BRIEF DESCRIPTION OF THE DRAWING

The above described and other features, aspects, and advantages of the present invention are better understood when the following detailed description of the invention is read with reference to the accompanying drawings, wherein:

FIG. 4 is a detail of a fence post where water is conveyed from the lower rail to the upper rail;

FIG. 5 is a detail of a fence post where water is conveyed from the upper rail to the lower rail;

FIG. 7 is a detail showing upper and lower rails carrying water and passing through a post.

DETAILED DESCRIPTION OF THE INVENTION

The present invention will now be described more fully hereinafter with reference to the accompanying drawings in which preferred embodiments of the invention are shown.

This invention may, however, be embodied in many different forms and should not be construed as limited to the embodiments set forth herein. These exemplary embodiments are provided so that this disclosure will be both thorough and complete, and will fully convey the scope of the invention to those skilled in the art.

Figure 1:
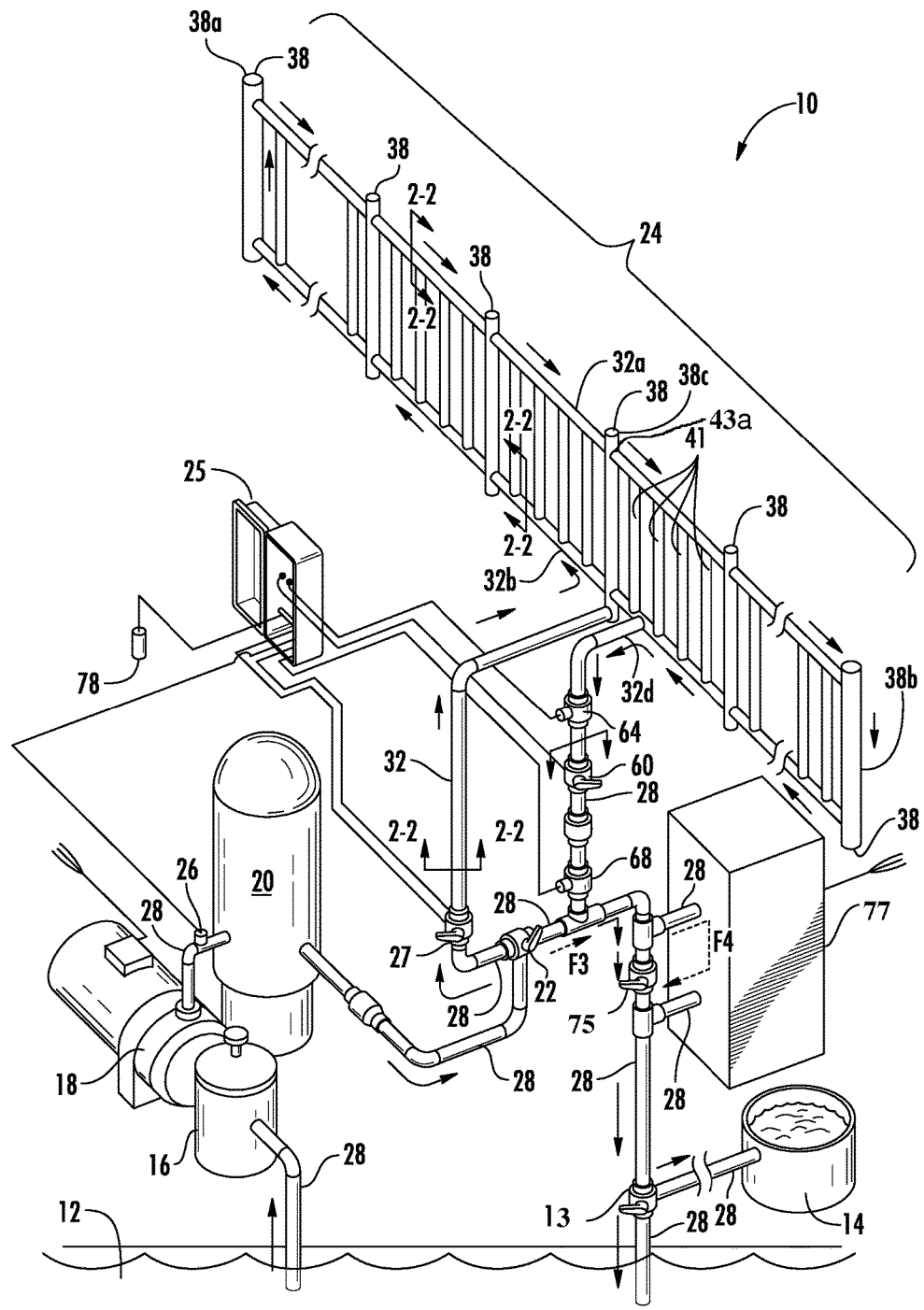
FIG. 1 is a schematic of a solar heating system for selectively adjusting the temperature of water in a swimming pool, in accordance with an embodiment of the present invention.

Referring to FIG. 1, a schematic of the invented solar heating system 10 is shown. The solar heating system 10 provides for the heating of water drawn from a body of water, then returning the heated water to the source or to another body of water. Throughout this specification, the body of water is principally described as a swimming pool 12, notwithstanding the body of water can be a hot tub 14, spa, hot water heater, and/or the like. Additionally, the solar heating system 10 may be used to provide heated water taken from one source and discharged into another body of water. For example and as illustrated, water drawn from a swimming pool 12 is heated by the solar heating system 10, then via valve 13 selectively discharged into the spa 14 and/or swimming pool 12 thereby allowing the water temperature therein to be increased.

The solar heating system 10 may also be used for cooling a body of water. For example, the system 10 may be run at night when the air is cooler than the water temperature in the pool. In this manner, water carried in the system loses heat to the environment and, thus, is returned to the pool at a cooler temperature than at which it was originally drawn from the pool.

Now considering the solar heating system 10 in greater detail and in reference to FIG. 1, water drawn from the swimming pool 12 is passed through a skimmer/drain 16, pump 18, and filter 20 as conventionally known. Thereafter, the water is then routed through a diverter value 22, such as a two-way valve, which allows for selective control of directing the water towards a fence assembly 24 and/or towards to the pool 12 bypassing the fence assembly 24 (indicated by arrow F3). Electronic controls 25 actuate the diverter valve 22, dictating the percentage of flow that is directed to the fence assembly 24 and that which is directed to the pool 12 bypassing the fence assembly 24.

A sensor 26 is provided at an in stream location prior to the fence assembly 24 to measure the current temperature of the pool water and flow rate of water being pumped into the system 10. A possible location is illustrated between the pump 18 and filter 20. Other locations (not illustrated) may alternatively be used such as between the filter 20 and two-way valve 22, or between the two-way valve 22 and fence assembly 24.

Figure 2:
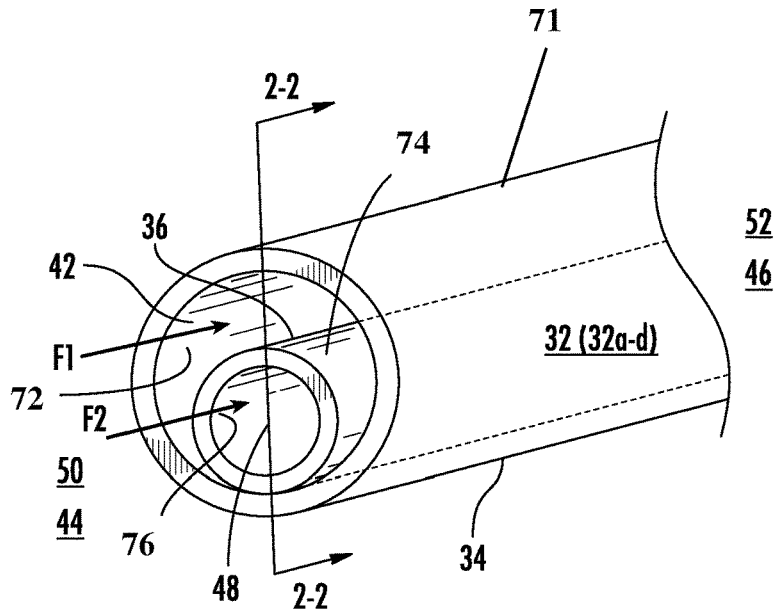
FIG. 2 is a cross-section of a rail, taken along section line 2-2 of FIG. 1, in accordance with an embodiment of the present invention.

A control valve 27, such as a 3-way valve, is provided between the diverter valve 22 and fence assembly 24 to divide water flowing into the valve 27 into two outgoing streams F1, F2 (FIG. 2) which are directed to the fence assembly 24. The control valve 27 is connected at its upstream side to conventional pipes 28, e.g. PVC pipe having a singular inner passageway to convey water, which carry water from the pool 12 to the value 27. At its downstream side, the control valve 27 is attached to a pipe 32 having nested first and second conduits 34, 36 (i.e. the second conduit 36 is disposed within the first conduit 34), as illustrated in FIG. 2. Thusly, the control valve 27 allows for water flow received through the conventional pipes 28 to be divided into two water stream F1, F2 being carried in separate conduits 34, 36 within the pipe 32. As used herein, the pipe 32 is also designated by reference numbers 32a, 32b, 32c, 32d depending on where in the system 10 that the pipe 32 is located. In each instance, the pipe 32, 32a, 32b, 32c, 32d is configured having first and second conduits 34, 36 as described herein.

Operation of the control valve 27 is dictated by the electronic controls 25, thereby allowing the control valve 27 to direct water flow fully through the first conduit 34, second conduit 36, or at any desired ratio divided between the first and second conduits 34, 36. In the preferred embodiment, the first conduit 34 has about a 2-inch outer diameter with ¼ inch thick wall and the second conduit 36 has about a 1-inch outer diameter with ¼ inch thick wall throughout their lengths, including where the conduits 34, 36 form part of the fence assembly 24 (i.e. 32a, 32b, 32c) and egress pipe 32d from the fence assembly, to allow for desired flow rates. The conduits 34, 36 are preferably made of PVC due to low material costs, workability, and suitable heat transfer characteristics for those portions which are used to absorb solar energy as part of the fence assembly 24. Notwithstanding, other suitable material may be used for the conduits 34, 36.

The pipe 32 is connected and carries water to the fence assembly 24. The fence assembly 24 comprises posts 38 intermittently placed in the ground for securing the fence assembly 24 in a predetermined location, upper and lower rails 32a, 32b which are attached to the posts 38 and through which water from the swimming pool flows and is heated by solar energy, and pickets 41 attached to and spanning between the upper and lower rails 32a, 32b thereby forming an effective barrier to prevent unauthorized access of persons and children to the pool.

At the fence assembly, the pipe 32 takes on the appearance and function of being the upper and lower rails 32a, 32b of the fence assembly 24. As such, the rails 32a, 32b have the appearance of a standard fence and may be provided in a variety of cross-sections, exterior surfaces, sizes, and colors. For example and not to be construed and limiting, the cross section of the may be circular or rectangular, have a smooth or granular looking exterior surface, and preferably a black exterior in order to maximize heat absorption from the sun. The rails 32a, 32b also have the structural integrity to function as conventional rails and meet local code requirements for fencing.

The pipe 32 may also have the appearance and function of being fence posts where water is being conveyed between the upper and lower rails 32a, 32b, such as designated fence posts 38a, 38b. However, more typically the posts 38 will be of a larger cross section than the rails 32a, 32b and require greater structural integrity in order to support the rails 32a, 32b. Thus, the designated fence posts 38a, 38b are preferably formed of a sturdy outer casing 39 having upper and lower openings 40a, 40b and a hollow interior 40c through which the pipe (identified by reference number 32c) is disposed, as illustrated in FIGS. 4 and 5. The pipe 32c has inner and outer conduits 34, 36 which match those of the upper and lower rails 32a, 32b for allowing the flow of water (F) between the rails 32a, 32b to remain divided in separate streams F1, F2 (FIG. 2). The pipe 32c may be comprised of PVC piping having elbows, flexible tubing, or other suitable arrangement, to direct the pipe 32c between the upper and lower rails 32a, 32b. The outer casing 39 of the fence post 38a, 38b may be made of a metal such as aluminum, plastic such as PVC, or other suitable material which exhibits strength characteristics necessary for use as a fence post.

Figure 6:
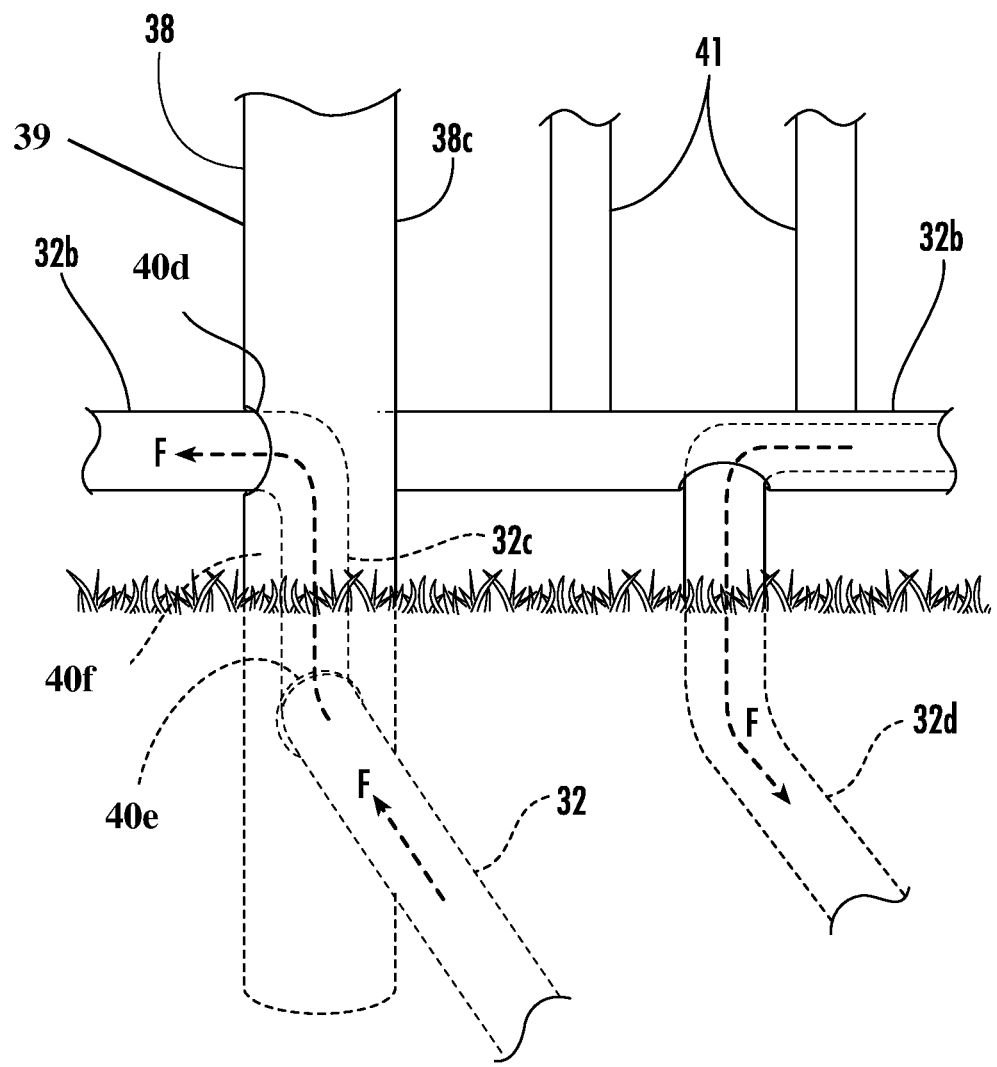
FIG. 6 is a detail showing water entering and exiting a fence assembly.

Preferably, water is introduced into the fence assembly 24 at a post, such as designated post 38c, as illustrated in FIG. 6. Designated post 38c is similar to posts 38a, 38b, being formed of a sturdy outer casing 39 having upper and lower openings 40d, 40e, and a hollow interior 40f through which the pipe 32c is disposed. However, instead of being used to allow the transport of water between the upper and lower rails 32a, 32b, designated post 38c allows for the entry of water from the pipe 32 into the lower rail 32b. By having water flow into the fence assembly 24 in this manner, the pipe 32 can be connected at an underground location to the post 38c thereby maintaining the appearance of a conventional stand alone fence.

Referring to FIG. 7, the posts 38 (aside from designated posts 38a, 38b, and post 38c which only has upper opening 43a (FIG. 1)) have upper and lower openings 43a, 43b through which the upper and lower rails 32a, 32b are respectively positioned. In being positioned within the openings 43a, 43b, the upper and lower rails 32a, 32b are carried and held in place by the posts 38.

The fence assembly 24 may be sold and installed in component parts or as partially assembled fence sections. For example, where sold in component parts the posts 38 may first be set and then the upper and lower rails 32a, 32b inserted through respective upper and lower openings 43a, 43b of the posts 38 (aside from designated posts 38a, 38b, and post 38c which only has upper opening 43a), as illustrated in FIG. 7. Ideally, the rails 32a, 32b come in long sections, the sections being joined end to end, along with pipe 32c, which forms uninterrupted first and second passageways 42, 48 (FIG. 2) through the fence assembly 24 through which water flows. For purposes of this application, in such an arrangement the rails 32a, 32b are considered attached to the posts 38 even though the rails 32a, 32b may only be carried by and not affixed to the posts 38.

Any suitable convention coupling means may be used to attach sections of the pipe 32, 32a-d together. For example, the ends of sections of the pipe 32, 32a-d (i.e. both first and second conduits 34, 36) may be complementary threaded such that sections of the pipe 32, 32a-d can be screwed together. As another example, section of pipe 32, 32a-d may be attached together through compression fittings. For any of the coupling means used, O-rings and other conventional leak prevention components may be utilized.

Where the fence assembly 24 is sold in fence sections, the sections may include, without limitation, a combination of the upper and lower rails 32a, 32b with attached pickets 41 and being attachable to the posts 38, or the upper and lower rails 32a, 32b being already attached to at least one post 38. Where the fence assembly 24 is provided as fence sections, without being construed as limiting, compression fittings are the preferred coupling means.

Referring to FIG. 2, each of pipes 32, 32a-d includes nested first and second conduits 34, 36. The first conduit 34 includes an exterior surface 71 and an inner surface 72. The first passageway 42 is defined between the inner surface 72 of the first conduit and the second conduit 36. The first passageway 42 has an inlet 44 (where pipe 32 began at the control valve 27), an outlet 46 (where pipe 32d ends at valve 60), and extends through and carries a first stream of water F1 through the pipes 32, 32a-d. The first conduit 34 communicates with water from the swimming pool by receiving water from the swimming pool via upstream elements and discharging water back into the swimming pool, or other body of water, via downstream elements. The percentage of water flow (F1/(F1+F2)) in the first conduit 34 as compared to the second conduit 36 is controlled by valve 27.

The second conduit 36 is disposed within the first conduit 34 and includes an exterior surface 74 and an inner surface 76 which defines the second passageway 48. The second passageway 48 includes an inlet 50 (where pipe 32 began at the control valve 27), an outlet 52 (where pipe 32d ends at valve 60), and extends through and carries a second stream of water F2 through the pipes 32, 32a-d. The second passageway 48 communicates with water from the swimming pool by receiving water from the swimming pool via upstream elements and discharging water back into the swimming pool, or other body of water, via downstream elements. The percentage of water flow (F2/(F1+F2)) in the second conduit 36 as compared to the first conduit 34 is controlled by valve 27.

The exterior surface 71 of the first conduit 34 is exposed to the environment such that the first conduit 34 absorbs solar energy. Preferably, the exterior surface 71 is of a dark color in order to enhance solar energy absorption. A portion of this energy is transmitted to and heats the first stream F1 of water. Similarly, a portion of the thermo energy within the first stream F1 of water is then transmitted to the second conduit 36, and then to the second stream of water F2, thereby heating the second stream F2 of water. During warm sunny periods, the amount of energy absorbed by the first stream F1 of water will be greater than the amount of energy absorbed by the second stream F2, thereby causing the first stream F1 to be heated to a temperature greater than that of the second stream F2. Accordingly, water at a range of temperatures may be discharged to the pool 12 by selecting the warmest water as provided by the first stream F1, warm water as provided by the second stream F2, or a temperature there-between by mixing the two water streams F1, F2.

There are also environmental conditions in which the first and second streams F1, F2 of water may lose energy to the environmental and, thus, decrease in temperature. For example, energy will be lost to the environment when there is no or little sunlight, (e.g. during nighttime) and the ambient temperature is less than that of the water streams F1, F2. This causes the first stream F1 to lose energy to the environment at a faster rate than does the second stream F2, because the first conduit 34 and first stream F1 act as an insulator to the second stream F2, causing the second stream F2 to be at a temperature greater than that of the first stream F1. Again, flexibility is offered by having the first and second streams F1, F2 at different temperatures. For example, in some circumstances the first stream F1 having lost energy overnight may be used to cool the pool water 12, which may be desirable during the hotter portions of summer. Whereas the second stream F2 may have retained enough heat in order to heat the pool water 12, if such is so desired.

As the fence assembly 24 necessarily has great length to properly enclose the perimeter of a swimming pool, the first and second rails 32a, 32b have great length and surface area to absorb solar energy. And, as dedicated posts 38a, 38b are used to conveyed water between the first and second rails 32a, 32b, each unit of water is caused to travel the combined lengths of the first and second rails 32a, 32b thereby providing heat absorption along a length nearly twice that of the fence. Typically, the dedicated posts 38a, 38b form the end posts where the fence is interrupted by for example a house or gate.

The dedicated posts 38a, 38b have first and second conduits 34, 36 having respective first and second passageways 42, 48. The exterior casing 39 may be placed around the first conduit to provide a post-like appearance or the first conduit 34 may be manufactured to appear as a post. The first passageway 42 of the posts 38a, 38b communicates with the first passageway 42 of the rails 32a, 32b, thereby allowing passage of the first stream F1 through the fence system 24. Likewise, the second passageway 48 of the posts 38a, 38b communicates with the second passageway 48 of the rails 32a, 32b, thereby allowing passage of the second stream F2 through the fence system 24. Ideally, the passageways of the posts 38a, 38b and rails 32a, 32b match in cross section so to minimize head loss as water transitions between the rails 32a, 32b and posts 38a, 38b.

Referring to FIG. 6, pipe 32d is illustrated as stemming from the lower rail 32a showing egress of water flow (F). Upon exiting the fence assembly 24, pipe 32d conveys the water F1, F2 to a valve 60, such as a 3-way valve. Although the pipe 32d is illustrated extending from the lower rail 32b, it could be attached to a post in a similar fashion as that described in reference to designated post 38c so to limit the amount of piping that is above ground and viewable to a person. The valve 60 allows for selective hold and release of water from the first and second conduits 32a, 32b to conventional piping 28 having a single passageway. Conventional piping 28 is utilized downstream from the valve 60 to carry heated water to the pool 12 and other elements. Upstream of the valve 60, preferably between the valve 60 and fence 24 or at the end of the fence 24, a sensor 64 is provide to measure the temperature of the water in the first and second conduits 32a, 32b so that water of the desire temperature may be release to the swimming pool via the conventional piping 62. A check valve 66 and an optional sensor 68 may be provided between the valve 60 and swimming pool, wherein the sensor 68 measures the temperature and flow rate of the water to be released into the swimming pool.

An optional heater 77, such as an electric heater, may be provided to further add heat to the circulated water. The heater 77 is located between the valve 60 and pool 12 so that water heated by the fence assembly 24 may be further heated by the heater 77 as may be desired on cloudy and/or cooler days in which the fence assembly 24 is not as effective, or to assists the system in providing exceptionally hot water for a hot tub or the like.

Additionally, the heater 77 may be used to heat water that is caused by the diverter valve 22 to bypass the fence apparatus 24. This mode may be used when environmental conditions are not suitable for using the fence apparatus 24 to heat pool water 12.

The solar heating system 10 is fully automated via the electronic controls 25, as illustrated by FIG. 1. Sensors determine the temperature and flow rate of the pool intake water 12 (sensor 29), the temperature and flow rate of water in the first and second conduit 32a, 32b exiting the fence apparatus 24 (sensor 64), the temperature and flow rate of discharge water after the valve 60 mixes the first and second streams F1, F2 to a desired ratio (sensor 68), and measures solar radiation and optionally ambient temperature and wind speed (sensor 78) to determine whether environmental conditions are suitable for utilizing the fence apparatus 24 for heating or cooling the pool water 12 as desired. Based on the sensor 29, 64, 68, 78 readings, intake pool water 12 may be directed through or held within the fence apparatus 24 via the first and/or second conduit 32a, 32b, water flows F1, F2 may be kept separate or mixed to achieve a desired temperature prior to being discharged into the pool, or a portion or all of the water may bypass the fence assembly 24.

In operation, pool water 12 is passed through the skimmer 16, pump 18, and filter 20 in a conventional manner. Thereafter, the diverter valve 22 is actuated to control whether intake water is directed to or bypasses the fence apparatus 24. Water directed to the fence apparatus 24 passes through valve 27 which divides the intake water into the first and/or second conduits 34, 36. The conduits 34, 36 form the top and bottom rails 32a, 32b, which takes the form of a fence and causes the water to be heated therein by solar radiation. Upon discharging from the fence apparatus 24, valve 60 allows for water from the first and second conduits 34, 36 to be combined as desired in order to achieve a desired water temperature. Discharge water may optionally be routed via valve 75 through a heater 77 (indicated by arrow F4) should additional heat be desired prior discharging the water back into the pool 12.

The following discussion concerning operation the solar heating system 10 is based on its use during suitable environmental conditions and where heating of pool water 12 is desired, as represented in Examples A and B below. To heat the pool water 12, diverter valve 22 directs at least a portion of the intake water towards the fence apparatus 24. Valve 27 is then actuated to control the percentage of flow entering the first conduit 34 and that entering the second conduit 36. In the examples, the flow was initially evenly divided for a period of time. As can be seen in Examples A and B, water in first and second conduits 34, 36 was heated to a greater temperature. As expected, water in the first conduit 34 experienced a greater increase in temperature as it was more directly effected by solar radiation than is the second conduit 36.

Referring Example A, water in the first and/or second conduits 34, 36 was released into the pool for a two hour period. Despite ambient air temperature of 65 degrees and a 15 mph wind, the solar heating system 10 increased the pool temperature from 74.6° F. to 76.6° F.

In Example B, water flow F1 was continuous in second conduit 36, whereas starting at 30 minutes into the experiment water was held in the first conduit 34 in a no flow condition. Despite ambient air temperature of 76° F. with a 5-10 mph wind, water temperature in the first conduit 34 dramatically rose to 94.1° F. as compared to the initial pool temperature of 78° F. Water in the first conduit 34 may be discharged into the pool 12 or may be utilized to insulate the second conduit 36 from rapid heat loss.

Applicant has determined that under typical environmental conditions, the most rapid and greatest increase in pool water 12 temperature is to continuously run water through the second conduit 36 while holding and releasing water in the first conduit 34. That is, water is held in a no flow state in the first conduit 34 until it has reached a significantly elevated temperature before being released, then repeating the process.

In Experiment C, it was determined that under warm summer conditions, the solar heating system may be used for heating a spa 14 or home water heater. In the example, numerous cycles were performed with the pool water of about 78° F. being heated in the first conduit 34 to a temperature of 104° F. to 116° F. For each cycle, the water was held in the first conduit 34 for a period of 30 minutes before being released. The ambient air temperature was 84° F. with partly cloudy conditions.

General Conditions for Experiments A-C

The pool is made of gunite, approx 25,000 gallons, having an average depth of 6 feet with a limited shallow end and deep end of about 8-9 feet deep. The pool is irregular in shape, but approximates a length×width size of 40'×20' Pool pump 18 circulates flow of approximately 20 gpm. The term n/f means that water is being held in the first conduit 34 under a no flow condition. Fence 24 is about 320 feet in length, with upper and lower rails 32a, 32b each about 320 feet in length. The first conduit 34 has a 2" outer diameter with ¼" thick wall, and the second conduit 36 has a 1" outer diameter with a ¼" thick wall.

Experiment A.
Ambient Air Temperature 65° F. with 15 Mph Wind

|  | Water Temperatures | | |
|---|---|---|---|
| Time Period (minutes) | Pool Temperature (° F.) | Second Conduit (° F.) | First Conduit (° F.) |
| 0 | 74.6 | 74.6 | 74.6 |
| 10 | 74.6 | 75.2 | 75.8 |
| 20 | 75.1 | 76.1 | 78.5 |
| 30 | 75.8 | 76.8 | 83.1 |
| 40 | 75.8 | 76.9 | 84.7 |
| 50 | 76.1 | 78.4 | 85.1 |
| 60 | 76.3 | 78.9 | 86.2 |
| 120 | 76.6 | 82.1 | 89.3 |

Experiment B.
Ambient Air Temperature 76° F. with 5-10 Mph Winds

|  | Water Temperatures | | |
|---|---|---|---|
| Time Period (minutes) | Pool Temperature (° F.) | Second Conduit (° F.) | First Conduit (° F.) |
| 0 | 78.0 | 78.0 | 79.4 |
| 10 | 78.0 | 78.5 | 79.4 |
| 20 | 78.0 | 78.7 | 90.4 n/f |
| 30 | 78.0 | 79.0 | 91.2 n/f |
| 40 | 78.0 | 79.0 | 91.7 n/f |
| 50 | 78.0 | 79.6 | 91.7 n/f |
| 60 | 78.0 | 80.3 | 92.3 n/f |
| 120 | 79.0 | 84.9 | 94.1 n/f |

Experiment C.

Ambient air temperature 84° F. with partly cloudy conditions sun (60%) clouds (40%). Water was held in a no flow condition in the first conduit 34 for a period of 30 minutes before being released. The time for release took about one minute. The cycle was performed numerous times with the water temperatures in the second conduit 36 ranging from 104° F. to 116° F. Approximately 56 gallons of heated water were released at the end of each cycle.

The foregoing provides a detailed description of exemplary embodiments of the present invention. Although embodiments and methods of a solar heating system 10 for a pool 12 has been described with reference to preferred embodiments and examples thereof, other embodiments and examples may perform similar functions and/or achieve similar results. All such equivalent embodiments and examples are within the spirit and scope of the present invention and are intended to be covered by the following claims.

Figure 8:
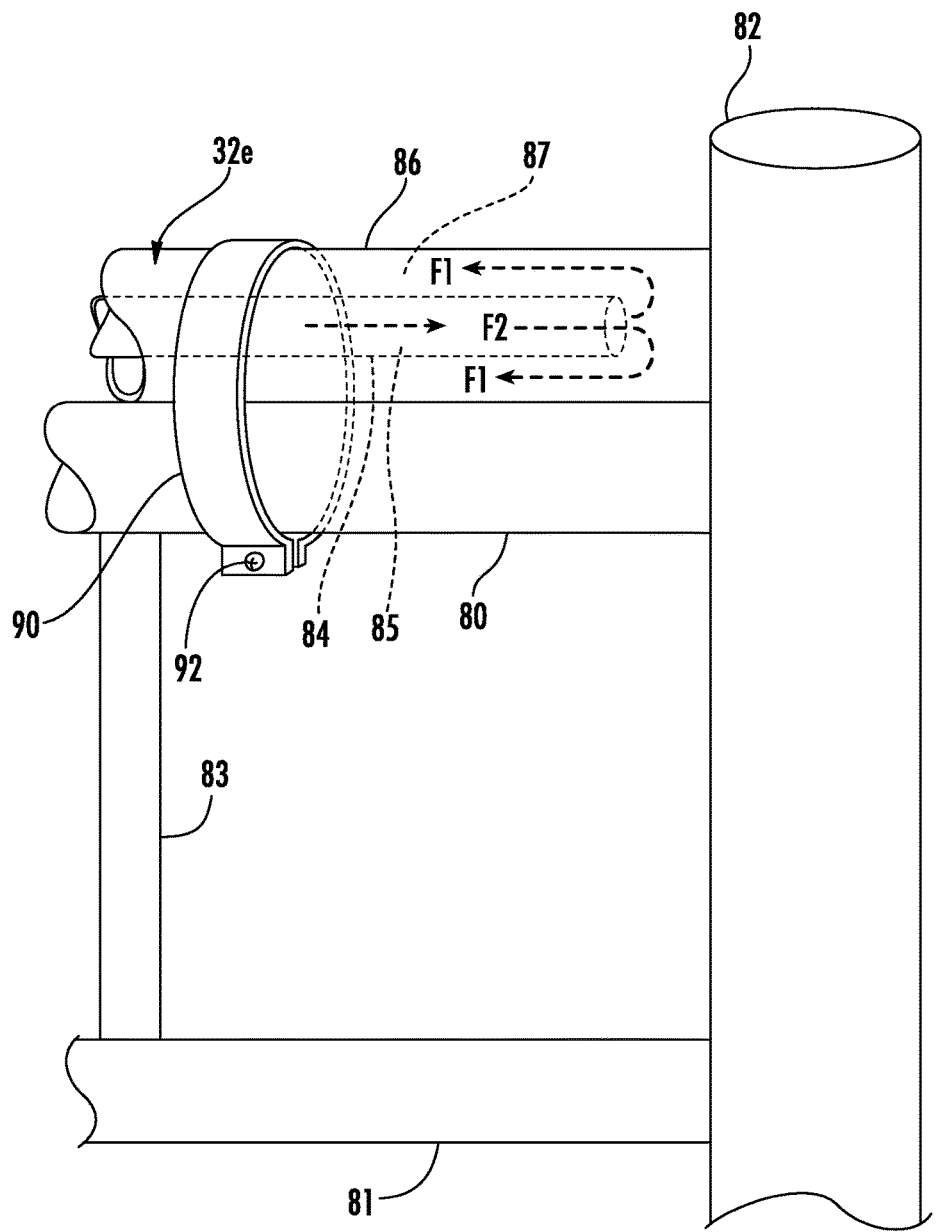
FIG. 8 is a fragmented view of an alternative fence assembly, wherein a pipe carrying water is retrofitted to a conventional fence for being heated by solar energy.

An alternative embodiment of the solar heating system 10a is illustrated in FIG. 8. The solar heating system 10a is useful as a retrofit device, having a pipe 32 capable of carrying water and being attachable to an existing conventional fence for increasing the water temperature of a pool. The pipe 32e is attached to an upper rail 80 of the fence by a band 90, strap, clamp, or other suitable device. The pipe 32e has nested first and second conduits 84, 86 similar to that as described in reference to upper rail 32a, except that first conduit 86 has a closed end and the second conduit 84 opens into the interior of the first conduit 86. In this fashion water flows (F1) into and down the length of the first conduit 84 before and flowing into the second conduit 86 and returning (F2) in the opposite direction.

The system 10a components upstream of control valve 27 and downstream of valve are the same as described herein with reference to FIG. 1 and are incorporated by reference into this alternative embodiment. Exceptions are that instead of having a control valve 27 and pipe 32, a singular pipe attaches to the inner conduit 84 to provide pool water to the inner conduit 84. And instead of having valve 60 and pipe 32d, a singular pipe attaches to outer conduit 86.

Figure 3:
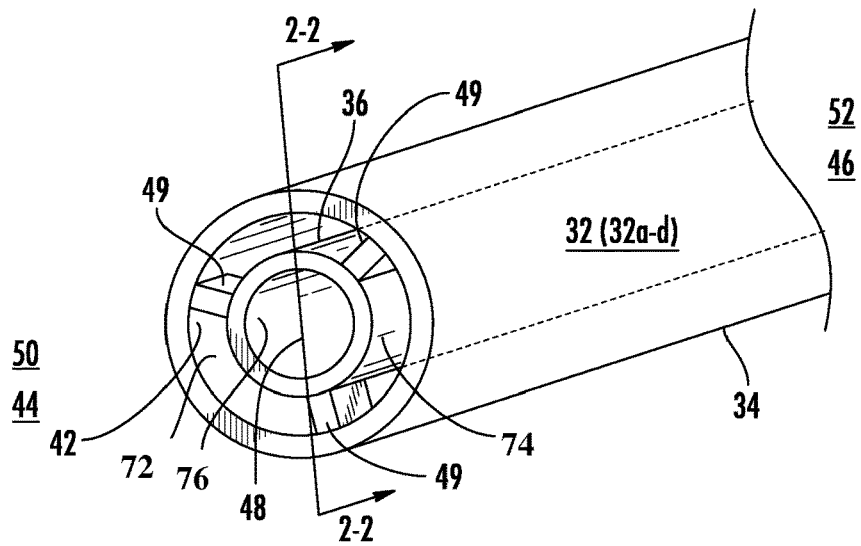
FIG. 3 is a cross-section of a rail, taken along section line 2-2 of FIG. 1, in accordance with an alternative embodiment of the present invention.

FIG. 3 is a cross-section of a rail 32 (32a-d), taken along section line 2-2 of FIG. 1, in accordance with an alternative embodiment of the present invention, wherein at least one spacer 49 is provided for positioning the second conduit 36 with relation to the first conduit 34.

That which is claimed is:

1. A water cooling and heating system for swimming pools and hot tubs, the system heating and/or cooling a flow of water drawn from a body of water and then returning the heated and/or cooled flow of water back to the body of water; the system comprising an inlet conduit in fluid communication with an associated body of water to be heated or cooled, the inlet conduit directing a flow of water from the associated body of water toward at least one horizontally extending fence rail having a first conduit and a second conduit substantially within the first conduit, the system having a diverter upstream of the first and second conduits and the diverter selectively diverting the flow of water into at least a first water portion and a second water portion, the first water portion being directed into the first conduit and the second water portion being directed into the second conduit, the first water portion having a first flow rate and the second water portion having a second flow rate and at least one of the first and second flow rates being adjustable, the first water portion having a first portion temperature and the second water portion having a second portion temperature, the first conduit of the horizontally extending fence rail having an exterior rail surface that is exposed to solar energy from the sun whereby a portion of the solar energy absorbed by the first conduit is transferred to and heats the first water portion within the first conduit, the second water portion within the second conduit being heated by the first water portion during operation; the system further including a hold and release valve and an outlet conduit in fluid communication with the associated body of water to return at least one of the first and second water portions back to the associated body of water, the hold and release valve selectively actuatable between a hold condition and a release condition, when in the hold condition the hold and release valve at least reducing the first flow rate to increase the first portion temperature in the first conduit and to increase the heating of the second water portion to increase the second portion temperature while allowing the second flow rate to be greater than the first flowrate thereby allowing the second water portion to flow into the outlet conduit and back to the associated body of water, when in the release condition, the first water portion being allowed to flow into the outlet conduit and back to the associate body of water.

2. The system of claim 1, wherein the first conduit has a first outer surface and a first inner surface defining a first passageway for the first flow of the first water portion and the second conduit has a second outer surface defining a second passageway for the second flow of the second water portion, the first inner surface of the first conduit and the second outer surface of the second conduit being opposite sides of a common wall.

3. The system of claim 1, wherein the horizontally extending fence rail is at least one of part of a fence and attachable to a fence.

4. The system of claim 1, wherein the first flow rate is substantially zero when in the hold condition.

5. The system of claim 1, wherein the first and second flow rates are maximized when in the release condition.

6. The system of claim 1, wherein the first flow rate is greater than zero and the second flow rate is substantially zero when in the release condition.

7. The system of claim 1, further including a first temperature sensor upstream of the first and second conduits to detect an inlet temperature from the associated body of water and a second temperature sensor upstream of the first and second conduits, temperature readings from the first and second temperature sensors at least in part controlling the actuation of the hold and release valve.

8. The system of claim 1, further including a bypass conduit in fluid connection between the inlet conduit and the outlet conduit, the bypass conduit selectively allowing at least some of the flow of water to bypass the first and second conduits.

9. The system of claim 1, further including a control valve upstream of the first and second conduits and the hold and release valve being downstream of the first and second conduits, the control valve for controlling a flow percentage of the first portion in the first conduit as compared to the second portion in the second conduit and the hold and release valve selectively allowing the first portion of water to be set to a no flow condition within the first conduit while the second portion of water is flowing within second conduit.

10. The system of claim 9, further including a first temperature sensor upstream of the first and second conduits to detect an inlet temperature from the associated body of water and a second temperature sensor upstream of the first and second conduits, temperature readings from the first and second temperature sensors at least in part controlling the actuation of at least one of the hold and release valve and the control valve.

11. The system of claim 1, wherein the first and second conduits are coaxial within the horizontally extending fence rail.

12. The system of claim 1, wherein the diverter includes a control valve upstream of the first and second conduits and the hold and release valve is downstream of the first and second conduits, the inlet conduit providing the flow of water to the control valve and the control valve selectively diverting the first and second portions of the flow of water into the first and second conduits.

* * * * *